(12) United States Patent
Hamada (10) Patent No.: US 9,611,974 B2
(45) Date of Patent: Apr. 4, 2017

(54) MEDIUM SUPPORT UNIT, RECORDING DEVICE, AND MEDIUM SUPPORT METHOD

(71) Applicant: SEIKO EPSON CORPORATION, Tokyo (JP)

(72) Inventor: Nobuhiko Hamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/934,764

(22) Filed: Nov. 6, 2015

(65) Prior Publication Data

US 2016/0136978 A1    May 19, 2016

(30) Foreign Application Priority Data

Nov. 17, 2014 (JP) ................................. 2014-232592

(51) Int. Cl.
*B41J 2/01* (2006.01)
*F16M 11/00* (2006.01)
*B41J 3/407* (2006.01)
*B41J 11/06* (2006.01)

(52) U.S. Cl.
CPC ............ *F16M 11/00* (2013.01); *B41J 3/4078* (2013.01); *B41J 11/06* (2013.01); *F16M 2200/08* (2013.01)

(58) Field of Classification Search
None
See application file for complete search history.

(56) References Cited

U.S. PATENT DOCUMENTS

| 7,413,301 | B2 | 8/2008 | Niimi et al. | |
| 7,765,927 | B1 | 8/2010 | Liu et al. | |
| 8,177,442 | B2 | 5/2012 | Abbott et al. | |
| 8,256,889 | B1 | 9/2012 | Abbott et al. | |
| 2005/0068358 | A1* | 3/2005 | Mizutani | B41J 2/2132 347/14 |
| 2008/0250952 | A1* | 10/2008 | Kubota | B41F 15/0818 101/126 |
| 2009/0231404 | A1* | 9/2009 | Niekawa | B41J 11/20 347/102 |
| 2013/0057632 | A1 | 3/2013 | Moriya et al. | |

FOREIGN PATENT DOCUMENTS

JP    2007-031888    2/2007
JP    2013-063637    4/2013

* cited by examiner

*Primary Examiner* — Matthew Luu
*Assistant Examiner* — Tracey McMillion
(74) *Attorney, Agent, or Firm* — Workman Nydegger (57) ABSTRACT

A medium support unit includes a support unit having a support surface that can support a medium and an adjustment unit that can form a first state in which a recessed portion that is recessed with respect to the support surface or a protruding portion that protrudes with respect to the support surface is formed and a second state in which the recessed portion or the protruding portion is not formed with respect to the support surface. At least one of color and texture is different between the support surface and the adjustment unit.

13 Claims, 10 Drawing Sheets

MEDIUM SUPPORT UNIT, RECORDING DEVICE, AND MEDIUM SUPPORT METHOD

BACKGROUND

1. Technical Field

The present invention relates to a medium support unit, a recording device, and a medium support method.

2. Related Art

A medium support unit that supports a medium has been used.

For example, JP-A-2013-63637 discloses a recording device including a medium support unit having a plate where a T-shirt or the like can be set.

Here, a garment such as a T-shirt has a thick part such as a part where a pocket or a button is included and a folded part of cloth. Therefore, in a recording device or the like which includes a medium support unit that can support a garment as a medium, if such a thick part is directly mounted on a support surface, the thick part rises and, for example, there is a risk that the thick part comes into contact with a recording unit or the like of the recording device.

Therefore, the recording device of JP-A-2013-63637 includes a recessed portion corresponding to such a thick part in the plate to be able to reduce the risk that the thick part comes into contact with the recording unit or the like.

On the other hand, in recent years, it is requested to perform recording or the like on media such as garments of various shapes, so that it is requested to handle various sizes and shapes of thick parts. Therefore, various sizes and shapes of formation portions of depressed portion are considered corresponding to the thick parts and it is difficult to know the formation portion of the depressed portion in the medium support unit, so that it may be difficult to easily form the depressed portion.

SUMMARY

An advantage of some aspects of the invention is to easily form a depressed portion in a medium support unit where the depressed portion in which a part of a medium is depressed with respect to a support surface can be formed.

A medium support unit of a first aspect of the invention is characterized by including a support unit having a support surface that can support a medium and an adjustment unit that can form a first state in which a recessed portion that is recessed with respect to the support surface or a protruding portion that protrudes with respect to the support surface is formed and a second state in which the recessed portion or the protruding portion is not formed with respect to the support surface. At least one of color and texture is different between the support surface and the adjustment unit.

In the first aspect, a medium support unit of a second aspect of the invention is characterized in that a material of the adjustment unit is different from a material of the support unit.

In the first aspect or the second aspect, a medium support unit of a third aspect of the invention is characterized in that mass of the adjustment unit is smaller than mass of the support unit.

In any one of the first to the third aspects, a medium support unit of a fourth aspect of the invention is characterized in that rigidity of the adjustment unit is higher than that of the support unit.

In any one of the first to the fourth aspects, a medium support unit of a fifth aspect of the invention is characterized in that the first state is formed by attaching the adjustment unit to the support unit and the second state is formed by removing the adjustment unit from the support unit.

In any one of the first to the fourth aspects, a medium support unit of a sixth aspect of the invention is characterized in that the first state or the second state is selected by changing a position of the adjustment unit with respect to the support unit.

In any one of the first to the sixth aspects, a medium support unit of a seventh aspect of the invention is characterized in that the adjustment unit can form the first state in which the recessed portion is formed and the second state in which the recessed portion is not formed.

In any one of the first to the sixth aspects, a medium support unit of an eighth aspect of the invention is characterized in that the adjustment unit can form the first state in which the protruding portion is formed and the second state in which the protruding portion is not formed.

A recording device of a ninth aspect of the invention is characterized by including the medium support unit of any one of the first to the eighth aspects and a recording unit that can perform recording on the medium supported by the medium support unit.

A medium support method of a tenth aspect of the invention is a medium support method of a medium support unit having a support unit including a support surface that can support a medium. The medium support method is characterized by including the step of causing the medium support unit to support the medium by switching the medium support unit between a first state in which a recessed portion that is recessed with respect to the support surface or a protruding portion that protrudes with respect to the support surface is formed and a second state in which the recessed portion or the protruding portion is not formed with respect to the support surface according to a type of the medium by using an adjustment unit whose at least one of color and texture is different from that of the support surface.

According to the invention, it is possible to easily form a depressed portion in a medium support unit where the depressed portion in which a part of a medium is depressed with respect to a support surface can be formed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a recording device according to embodiments of the invention will be described in detail with reference to the attached drawings.

The embodiments below are described using a recording device including a medium support unit. However, the medium support unit of the invention is not limited to a medium support unit included in a recording device.

The embodiments below are described using an ink jet recording device, which performs recording by discharging ink from a recording head, as the recording device. However, the recording device of the invention is not limited to an ink jet recording device.

First Embodiment

FIGS. 1 to 10

First, a recording device according to a first embodiment of the invention will be described.

Figure 1:
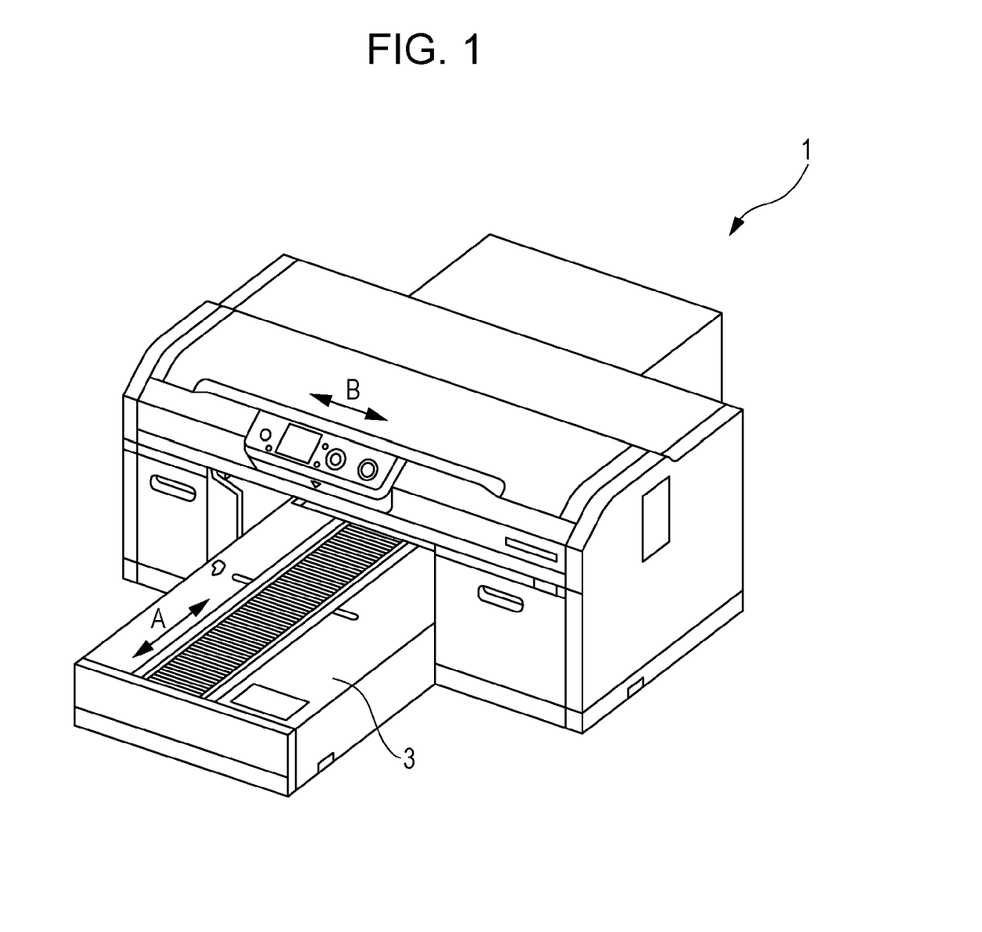
FIG. 1 is a schematic perspective view of a recording device according to a first embodiment of the invention.
Figure 2:
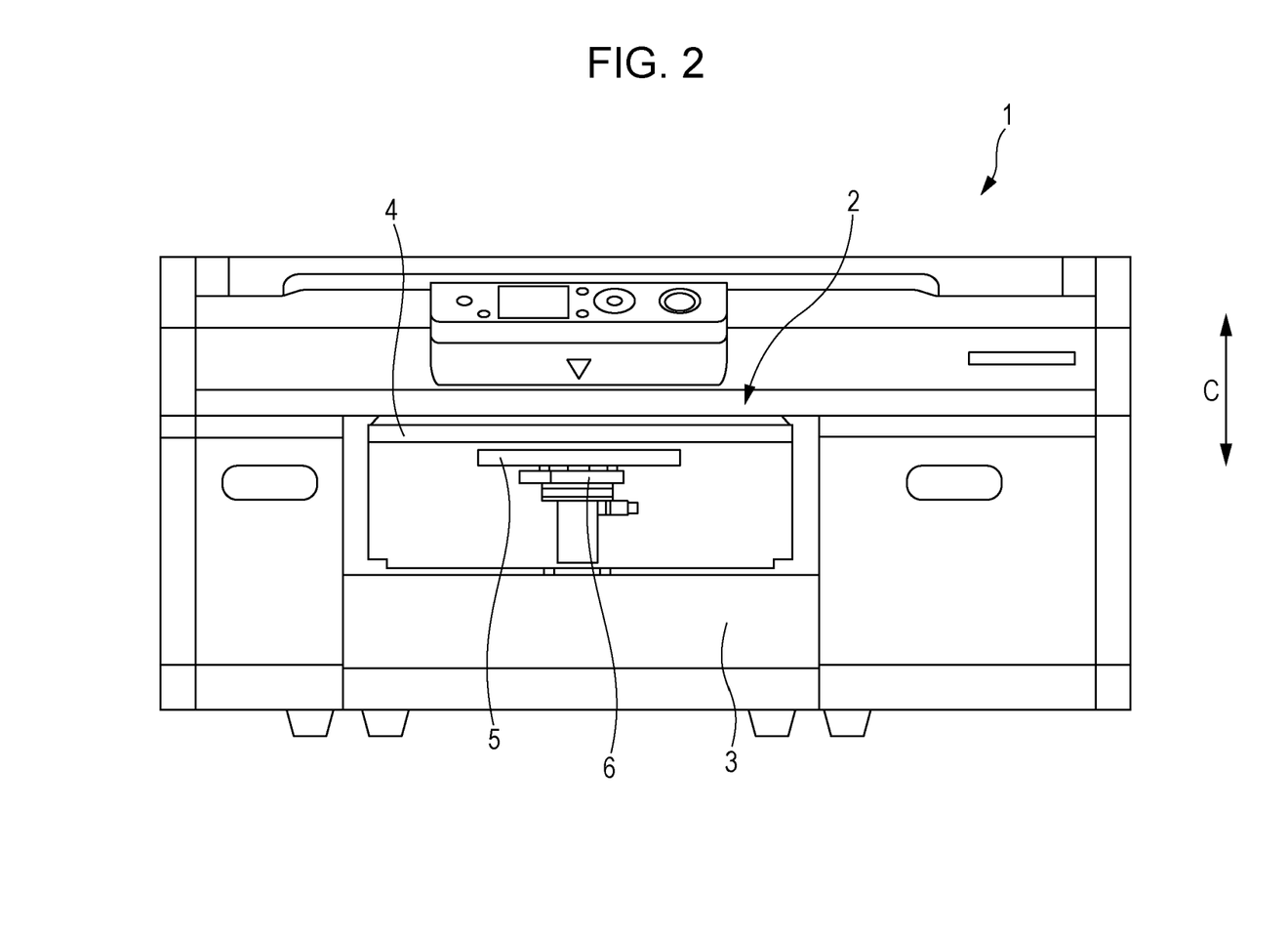
FIG. 2 is a schematic front view of the recording device according to the first embodiment of the invention.

FIG. 1 is a schematic perspective view of a recording device 1 according to the first embodiment of the invention. FIG. 2 is a schematic front view of the recording device according to the first embodiment of the invention.

The recording device 1 of the present embodiment includes a medium transport unit 3 that transports a medium supported by a tray 4, which is a support unit of the medium in the medium support unit 2, in a transport direction A. The tray 4 is fixed in a state in which the tray 4 is mounted on a stage 5. The tray 4 moves along with the stage 5 in a height direction C by rotating a rotation lever 6.

A recording head (not shown in the drawings), which is a recording unit, is provided inside a main body of the recording device 1. The recording device 1 of the present embodiment forms a desired image by discharging ink from the recording head to the medium supported by the tray 4 while reciprocating the recording head, which is the recording unit, in a scanning direction B crossing the transport direction A. In the recording device 1 of the present embodiment, a front portion (a lower left portion) in FIG. 1 is a setting position of the medium onto the tray 4 and the recording is performed while the tray 4 is moving toward the front in FIG. 1 after the tray 4 where the medium is set is moved to a recording start position at a rear portion (an upper right portion) in FIG. 1.

Next, the medium support unit 2, which is a main part of the recording device 1 of the present embodiment, will be described.

Figure 3:
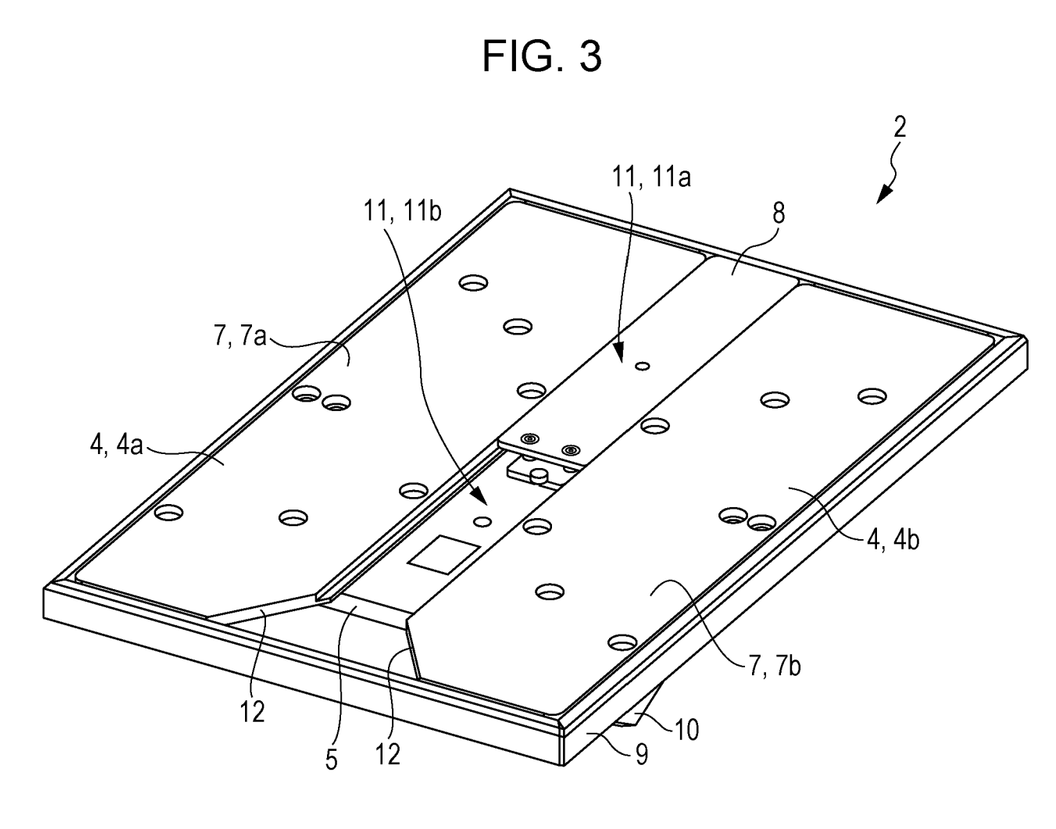
FIG. 3 is a schematic perspective view of a medium support unit according to the first embodiment of the invention.
Figure 4:
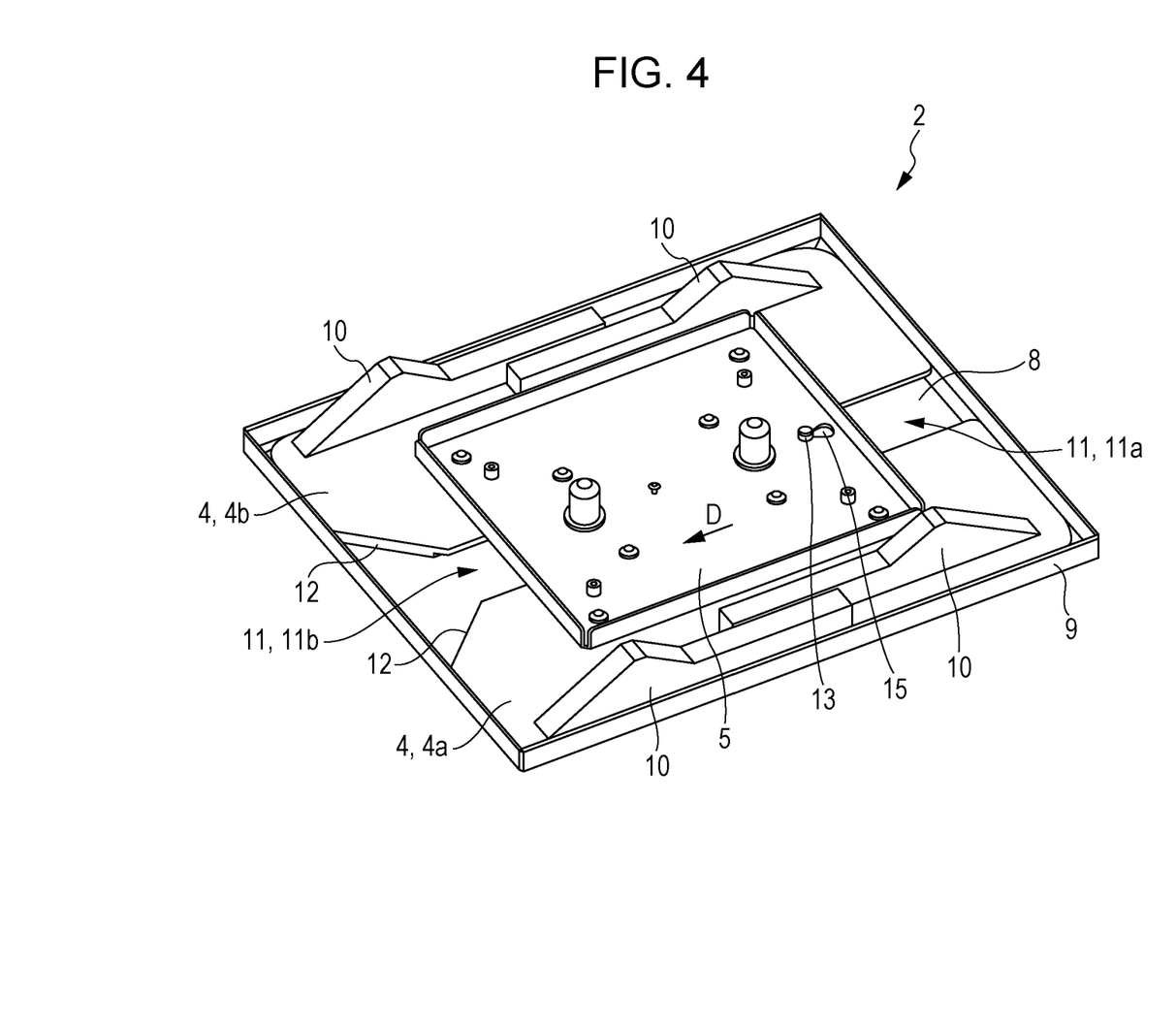
FIG. 4 is a schematic perspective view of the medium support unit according to the first embodiment of the invention.

FIG. 3 is a schematic perspective view of the medium support unit 2 of the present embodiment as seen from a diagonally upward position. FIG. 4 is a schematic perspective view of the medium support unit 2 of the present embodiment as seen from a diagonally downward position.

Figure 5:
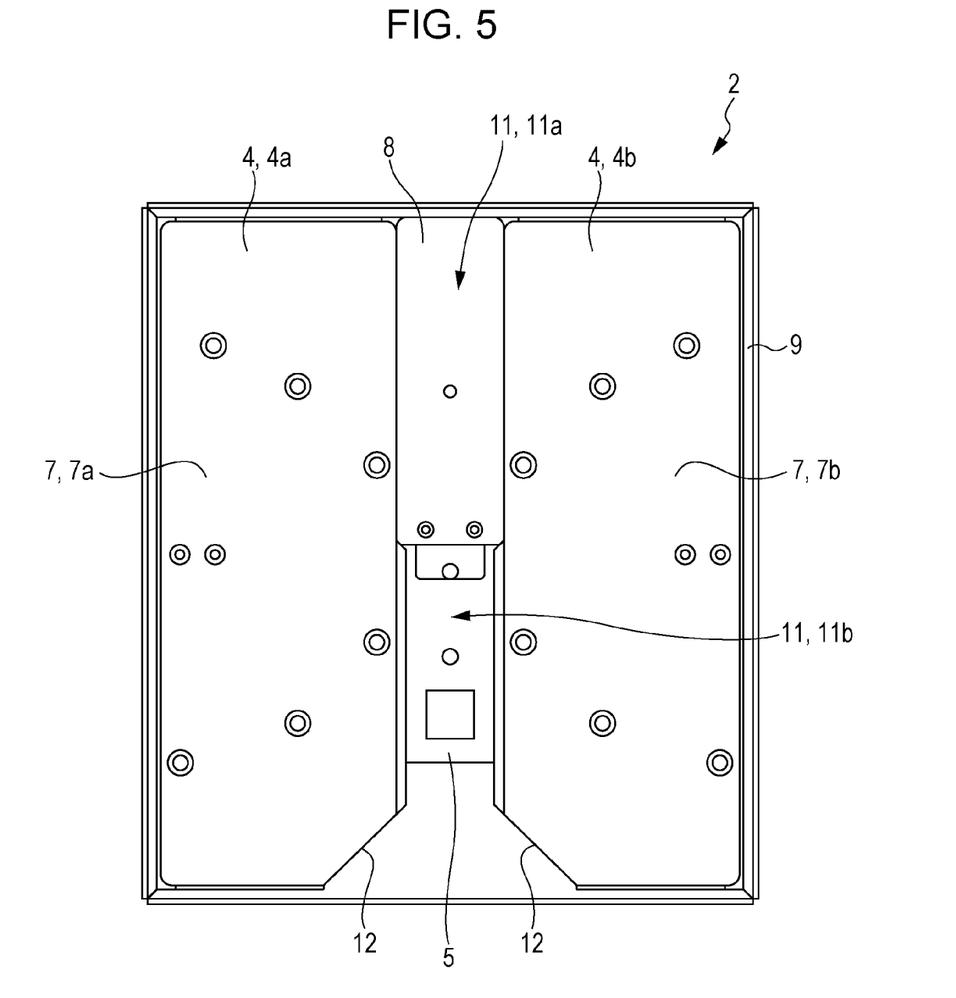
FIG. 5 is a schematic plan view of the medium support unit according to the first embodiment of the invention.

FIG. 5 is a schematic plan view of the medium support unit 2 according to the present embodiment.

The medium support unit 2 of the present embodiment can be attached to and removed from the recording device 1 and includes the tray 4 (a support unit) having a support surface 7 that can support a medium. In other words, the medium support unit 2 includes a support unit 4 having the support surface 7 that can support a medium. Further, the medium support unit 2 includes the stage 5 where the tray 4 is mounted, an adjustment unit 8 that can adjust a support area of the medium, an outer frame portion 9 that suppresses the medium supported by the support surface 7 at an outer edge portion, and a leg portions 10 which are setting portions used when the medium support unit 2 is removed from the recording device 1.

Further, the medium support unit 2 of the present embodiment includes a depressed portion 11 in which a part of the medium supported by the support surface 7 is depressed with respect to the support surface 7. The depressed portion 11 of the present embodiment includes a first area 11a that is formed by removing the adjustment unit 8 from the tray 4 which is the support unit and a second area 11b that is in a depressed state at all times. However, the depressed portion 11 need not include the second area 11b that is in a depressed state at all times if the depressed portion 11 includes the first area 11a which is formed by attaching or removing the adjustment unit 8 to or from the tray 4 or changing the position of the adjustment unit 8 with respect to the tray 4.

In the medium support unit 2 of the present embodiment, color and texture of the tray 4 are different from those of the adjustment unit 8. Specifically, the tray 4 is formed of a colorless and transparent acrylic material and the adjustment unit 8 is formed of a metal painted in white. As a result, regarding the color, the tray 4 is transparent and the adjustment unit 8 is opaque. Regarding the texture, the tray 4 has a smooth surface having a texture of glossy feeling and the adjustment unit 8 has a grained surface having a texture of mat feeling. However, at least only one of the color and the texture needs to be different between the support surface 7 and the adjustment unit 8 of the tray 4. The tray 4 may have any color or may be opaque, and the adjustment unit 8 may be transparent or may have a chromatic color or an achromatic color other than white.

In other words, the medium support unit 2 of the present embodiment has the adjustment unit 8 that can form a first state in which a recessed portion (the depressed portion 11) that is recessed with respect to the support surface 7 is formed (a state in which the adjustment unit 8 is removed and the first area 11a becomes the depression portion 11) and a second state in which the recessed portion is not formed (a state in which the adjustment unit 8 is attached and the first area 11a does not become the depression portion 11). At least one of the color and the texture is different between the support surface 7 and the adjustment unit 8. Here, as the first state, it is possible to form a protruding portion that protrudes with respect to the support surface 7 to form the depressed portion 11 in an area other than the protruding portion, and as the second state, it is possible not to from the protruding portion that protrudes with respect to the support surface 7.

In this way, the depressed portion 11 in which a part of the medium supported by the support surface 7 is depressed with respect to the support surface 7 can be formed, so that it is possible to suppress a rise of the medium supported by the support surface 7 even when the medium including a thick part is used.

The "thick part" means a part which is thicker than the other parts of the medium. For example, when the medium is a garment, the thick part corresponds to a collar part, a pocket part, a button part, a zipper part, a part where fabrics are overlapped (a connection portion between garment bodies and a folded part of pants), and the like.

Further, when at least one of the color and the texture is made different between the support surface 7 and the adjustment unit 8, it becomes easy to visually or tactually know a part where the depressed portion 11 is formed, so that it is easy to form the depressed portion 11.

"At least one of the color and the texture is made different between the support surface 7 and the adjustment unit 8" means that the support surface 7 and the adjustment unit 8 are formed to be able to be visually or tactually distinguished from each other.

The tray 4 of the present embodiment is provided with a cut portion 12 so that a collar or the like of a shirt or a polo shirt can be saved downward (so that a rise can be suppressed).

The first area 11a and the second area 11b are continuously formed, so that it is possible to handle a continuous large thick part by making the first area 11a be able to cause the medium to be depressed continuously from the second area 11b that can depress the medium at all times.

For example, when using a polo shirt whose thick part is small, it is possible to cause the medium support unit 2 to support the polo shirt by attaching the adjustment unit 8 to reduce the area of the depressed portion 11, and when using a shirt whose thick part is large, it is possible to cause the medium support unit 2 to support the shirt by removing the adjustment unit 8 to increase the area of the depressed portion 11.

The tray 4 of the present embodiment includes a first tray 4a and a second tray 4b and the support surface 7 includes a first support surface 7a provided to the first tray 4a and a second support surface 7b provided to the second tray 4b. The first support surface 7a and the second support surface 7b are provided to be away from each other and the depressed portion 11 is formed between the first support surface 7a and the second support surface 7b.

By such a configuration, the depressed portion 11 of the present embodiment is largely formed between the first support surface 7a and the second support surface 7b to be able to handle a continuous large thick part such as a part where buttons are formed on a shirt. For example, it is possible to handle even a medium including a thick portion, which vertically divides the medium, such as a full zip type fastener by removing the adjustment unit 8 and using the two support surfaces (the first support surface 7a and the second support surface 7b) away from each other. Regarding a medium including a thick portion, which does not vertically divide the medium, such as a half zip type fastener, it is possible to support the medium by three support surfaces (the first support surface 7a, the second support surface 7b, and the adjustment unit 8) in a state in which the adjustment unit 8 is attached.

As described above, the medium support unit 2 of the present embodiment can support a garment as a medium and the depressed portion 11 is formed to be able to depress a thick part of the garment when the medium is the garment. Therefore, even when a garment including a thick part such as a collar, a button, a zipper, a pocket, and a part where fabric is folded is used as a medium, the medium support unit 2 can suppress a rise of the medium corresponding to the thick part.

In the medium support unit 2 of the present embodiment, the mass of the adjustment unit 8 is smaller than the mass of the tray 4. In other words, the adjustment unit 8 is made to be relatively light. Therefore, the adjustment unit 8 is easy to handle, so that a forming operation of the depressed portion 11 (the first area 11a) is easy.

Further, as described above, the tray 4 is formed of a colorless and transparent acrylic material and the adjustment unit 8 is formed of a metal painted in white. In other words, the adjustment unit 8 and the tray 4 are formed of respective materials different from each other according to required characteristics such as weight and rigidity.

From the point of view of rigidity, the adjustment unit 8 of the present embodiment can be attached to and removed from the medium support unit 2, so that a case is considered in which the removed adjustment unit 8 falls on a floor. Therefore, the adjustment unit 8 requires rigidity higher than that of the tray 4. Therefore, in the medium support unit 2 of the present embodiment, the rigidity of the adjustment unit 8 is set higher than that of the tray 4. The adjustment unit 8 is made robust in this way, so that damage of the adjustment unit 8 is suppressed.

Next, the adjustment unit 8 where the size of the depressed portion 11 can be adjusted will be described in detail.

Figure 6:
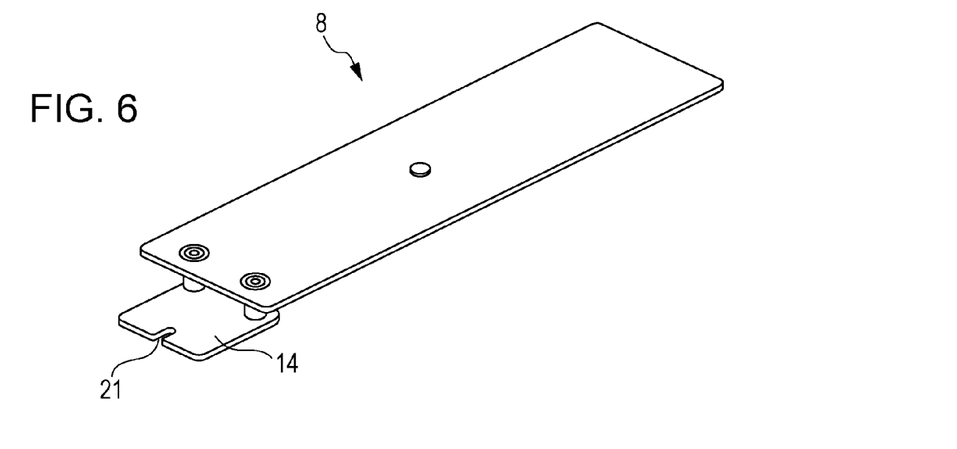
FIG. 6 is a schematic perspective view of a main part of the medium support unit according to the first embodiment of the invention.
Figure 7:
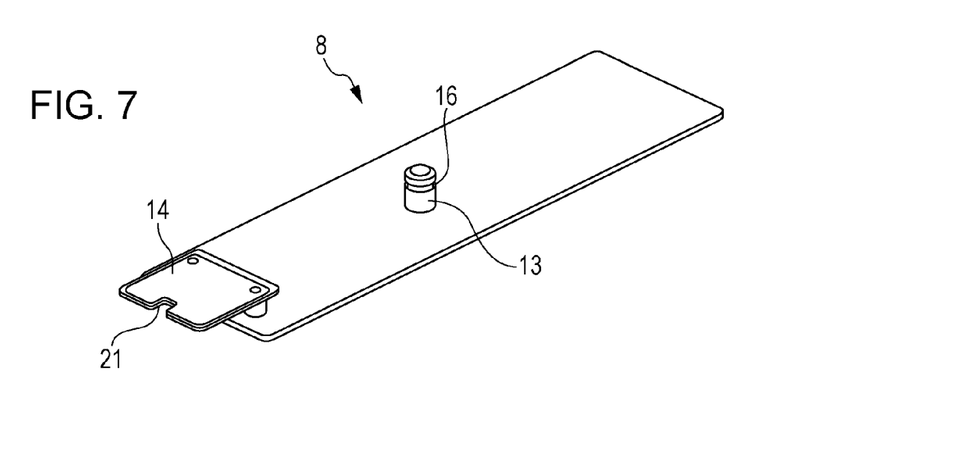
FIG. 7 is a schematic perspective view of the main part of the medium support unit according to the first embodiment of the invention.
Figure 8:
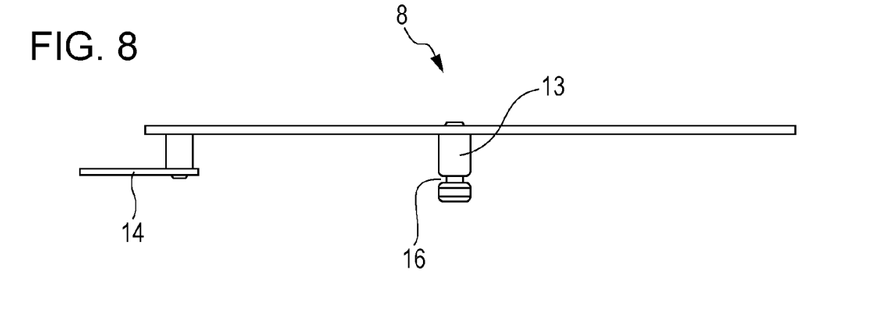
FIG. 8 is a schematic side view of the main part of the medium support unit according to the first embodiment of the invention.
Figure 9:
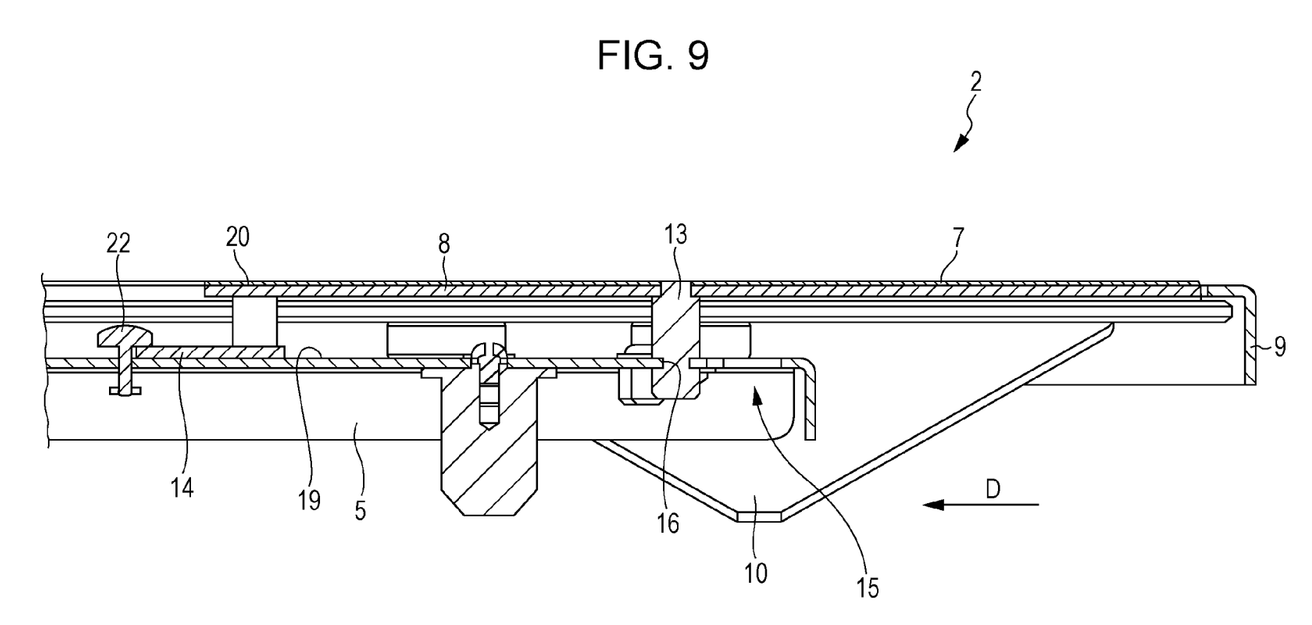
FIG. 9 is a schematic side cross-sectional view of the medium support unit according to the first embodiment of the invention.
Figure 10:
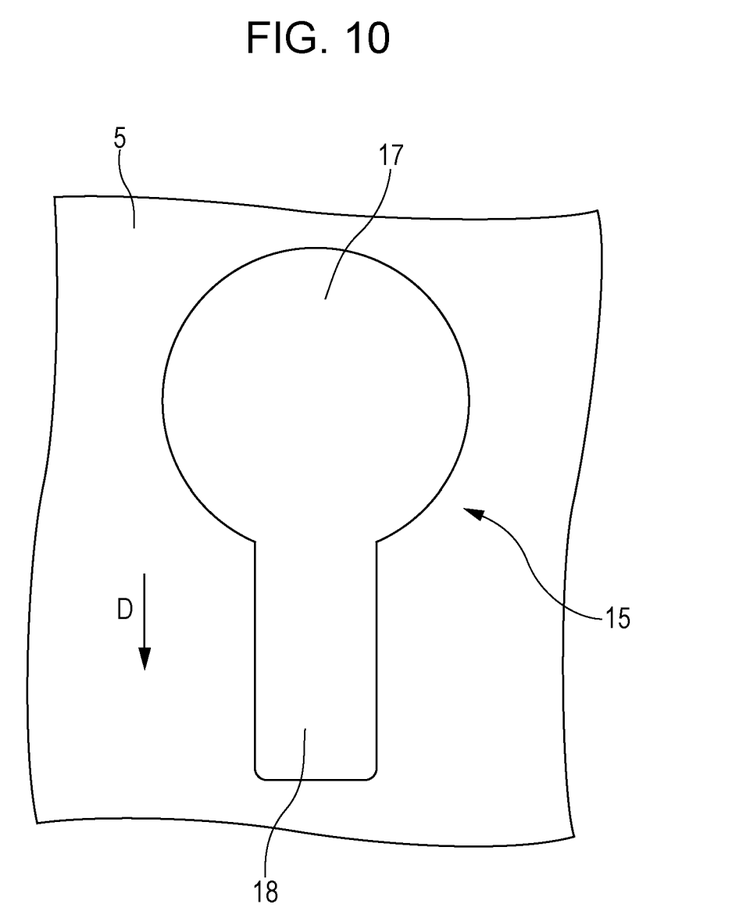
FIG. 10 is a schematic plan view of a main part of the medium support unit according to the first embodiment of the invention.

FIGS. 6 and 7 are schematic perspective views of the adjustment unit 8 removed from the medium support unit 2. FIG. 6 is a view of the adjustment unit 8 as seen from a diagonally upward position. FIG. 7 is a view of the adjustment unit 8 as seen from a diagonally downward position. FIG. 8 is a schematic side view of the adjustment unit 8 removed from the medium support unit 2. FIG. 9 is a schematic side cross-sectional view of the medium support unit 2 in a state in which the adjustment unit 8 is attached to the medium support unit 2. FIG. 10 is a schematic plan view of a portion where the adjustment unit 8 is attached in the medium support unit 2.

As shown in FIGS. 3 to 5 and 9, the adjustment unit 8 of the present embodiment can be attached to the medium support unit 2. Further, as shown in FIGS. 6 to 8, the adjustment unit 8 of the present embodiment can be removed from the medium support unit 2. In other words, a first state (a state in which a recessed portion or a protruding portion is formed) appears when the adjustment unit 8 is attached to the support unit 4 and a second state (a state in which a recessed portion or a protruding portion is not formed) appears when the adjustment unit 8 is removed from the support unit 4. By this configuration, it is possible to adjust the size of the depressed portion 11 (it is possible to form the depressed portion 11 corresponding to the first area 11a) by attaching or removing the adjustment unit 8 of the present embodiment to or from the depressed portion 11 of the medium support unit 2. As described above, the adjustment unit 8 can be attached to and removed from the medium support unit 2, so that it is possible to reduce the weight of the medium support unit 2 by removing the adjustment unit 8 when forming the depressed portion 11 corresponding to the first area 11a. A phrase that the size of the depressed portion 11 "can be adjusted" can be rephrased into a phase that the size of the depressed portion 11 "can be changed" to a desired size.

However, the adjustment unit 8 is not limited to the configuration described above. For example, the size of the depressed portion 11 may be made adjustable (the depressed portion 11 corresponding to the first area 11a can be formed) by changing (moving) the position of the adjustment unit 8 with respect to the depressed portion 11 instead of attaching or removing the adjustment unit 8 to or from the depressed portion 11 of the medium support unit 2. In other words, the first state or the second state may be selected by changing the position of the adjustment unit 8 with respect to the support unit 4. When using the above configuration, the adjustment unit 8 need not be removed when forming the depressed portion 11 corresponding to the first area 11a, so that it is not necessary to provide an installation space of the adjustment unit 8. Further, it is possible to reduce the possibility of missing the adjustment unit 8.

As shown in FIGS. 6 to 9, the adjustment unit 8 of the present embodiment includes a mounting portion 14 that can be mounted on a mounting surface 19 (see FIG. 9) provided on the stage 5 and an insertion portion 13, a part of which is inserted into a hole portion 15 (see FIG. 4) provided in the mounting surface 19.

As shown in FIG. 10 showing the hole portion 15 provided in the stage 5, the hole portion 15 is provided with a large-diameter portion 17 into which the insertion portion 13 can be inserted and a small-diameter portion 18 (see FIGS. 7 to 9) into which a small-diameter insertion portion 16 provided to the insertion portion 13 can be fitted.

When the adjustment unit 8 is fixed to the stage 5, as shown in FIGS. 4 and 9, a part of the insertion portion 13 is inserted in the large-diameter portion 17 of the hole portion 15 and is moved in an insertion direction D, so that the small-diameter insertion portion 16 of the insertion portion 13 is fitted into the small-diameter portion 18 of the hole portion 15. Then, a user fixes a fixing portion 21 (see FIGS. 6 and 7) provided to the mounting portion 14 to the stage 5 with a screw 22 (see FIG. 9), so that the adjustment unit 8 is fixed to the stage 5.

The vertical length of the small-diameter insertion portion 16 in FIG. 9 is formed larger than the thickness of a component member of the mounting surface 19 of the stage 5, so that a gap is generated between the small-diameter insertion portion 16 and the component member of the mounting surface 19. Therefore, it is easy to attach the adjustment unit 8 to the medium support unit 2.

As shown in FIG. 9, the adjustment unit 8 is provided with an adjustment surface 20, which becomes a surface of the adjustment unit 8 when the adjustment unit 8 is attached to the medium support unit 2. The adjustment surface 20 becomes a surface that supports a medium when the adjustment unit 8 is attached. So, the adjustment surface 20 can be said to be a third support surface. The adjustment surface 20 is configured to be positioned lower than the support surface 7 of the tray 4 when the adjustment unit 8 is attached to the medium support unit 2. This is to prevent the medium from coming into contact with the recording head in a portion where the medium is held by the adjustment surface 20. Although not limited to the configuration as described above, it is preferable that the adjustment surface 20 is the same level as the support surface 7 or the adjustment surface 20 is positioned at a level lower than the support surface 7.

The attaching method and the fixing method of the adjustment unit 8 are not limited to the attaching method and the fixing method of the adjustment unit 8 to the medium support unit 2 as described in the present embodiment, but it is possible to use an attaching method and a fixing method of the adjustment unit 8 to the medium support unit 2 by using a magnet, a hook and loop fastener, or the like.

Second Embodiment

Figure 11:
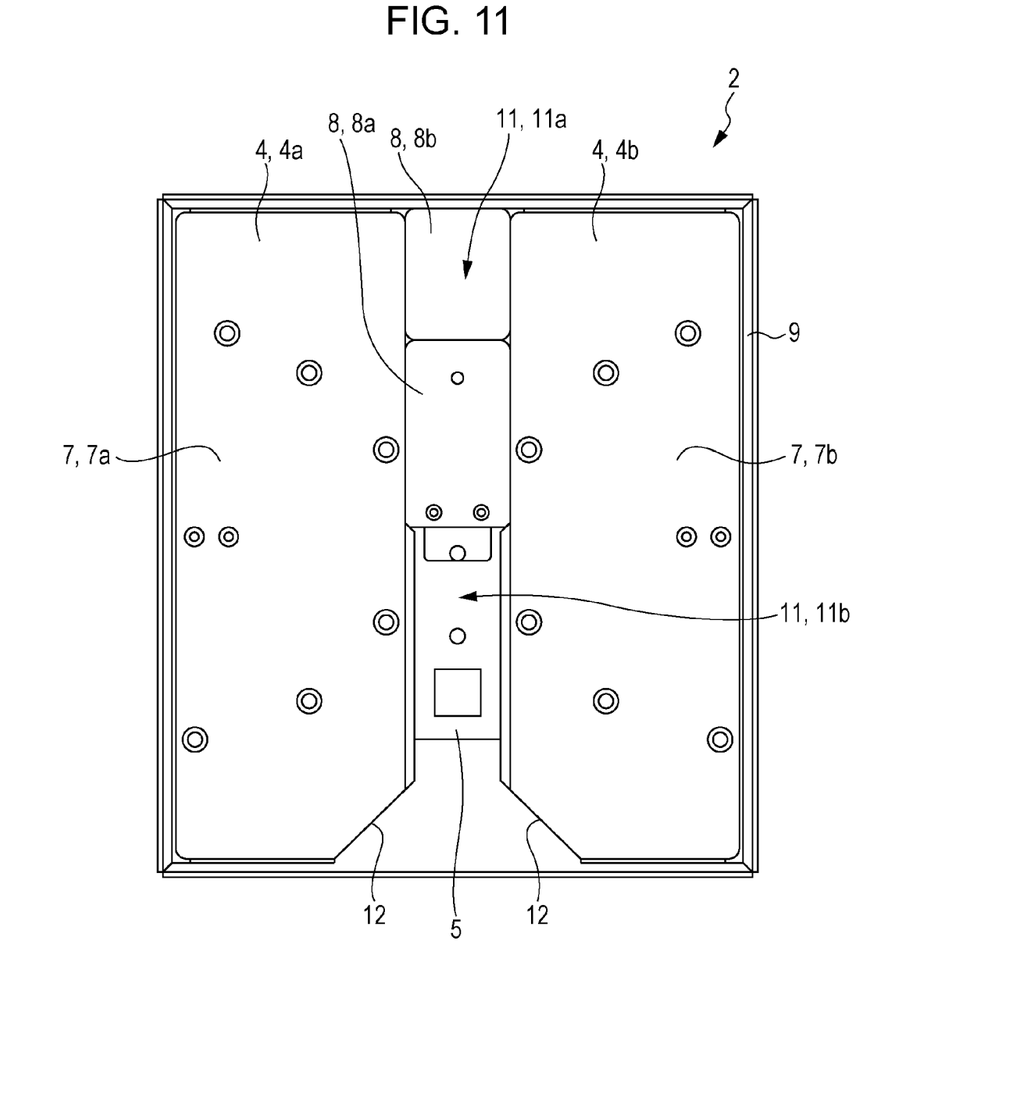
FIG. 11 is a schematic plan view of a medium support unit according to a second embodiment of the invention.

FIG. 11

Next, a medium support unit 2 according to a second embodiment of the invention will be described. The same components as those in the first embodiment are denoted by the same reference numerals and the detailed description thereof will be omitted.

FIG. 11 is a schematic plan view of the medium support unit 2 according to the second embodiment of the invention.

The medium support unit 2 of the present embodiment has the same configuration as that of the medium support unit 2 of the first embodiment except for the configuration of the adjustment unit 8 where the size of the depressed portion 11 can be adjusted.

As shown in FIG. 11, the adjustment unit 8 of the present embodiment has a first adjustment unit 8a and a second adjustment unit 8b. In other words, the adjustment unit 8 has a plurality of adjustment units. Therefore, it is possible to easily adjust the size of the depressed portion 11 to a plurality of sizes by using a plurality of adjustment units, which are the first adjustment unit 8a and the second adjustment unit 8b, so that it is possible to handle various sizes of thick parts.

The adjustment unit 8 of the present embodiment can adjust the size of the depressed portion 11 by using both or one of the first adjustment unit 8a and the second adjustment unit 8b. Further, it is possible to adjust the size of the depressed portion 11 by using one of the first adjustment unit 8a and the second adjustment unit 8b whose sizes and shapes are different from each other.

As shown in FIG. 11, in the adjustment unit 8 of the present embodiment, the first adjustment unit 8a and the second adjustment unit 8b have sizes and shapes different from each other. In this way, when a plurality of adjustment units whose sizes and shapes are different from each other are provided, it is possible to easily adjust the size of the depressed portion 11 by, for example, selecting and using one of the first adjustment unit 8a and the second adjustment unit 8b according to the shape and size of the thick part. However, when there is a plurality of adjustment units, a plurality of adjustment units whose sizes and shapes are the same may be used. Further, it is possible to combine and use the adjustment units whose sizes (areas of a portion that supports the medium) are the same and whose shapes (shapes in plan view of a portion that supports the medium) are different from each other. Further, it is possible to combine and use the adjustment units whose shapes are the same and whose sizes are different from each other. As the shape of the adjustment unit, it is possible to use various shapes such as a polygon, a circle, and a shape corresponding to a design of a certain part of a garment.

Both of the first adjustment unit 8a and the second adjustment unit 8b of the present embodiment are formed of metal and have chromatic colors different from each other. Therefore, it is easy to visually distinguish the first adjustment unit 8a and the second adjustment unit 8b with respect to the tray 4 formed of a colorless and transparent acrylic material and it is easy to know the sizes and shapes of the first adjustment unit 8a and the second adjustment unit 8b. However, at least only one of the color and the texture of the first adjustment unit 8a and the second adjustment unit 8b needs to be different from that of the tray 4. The first adjustment unit 8a and the second adjustment unit 8b may have the same color and the same texture. However, when there is a plurality of adjustment units, each adjustment unit may have a different color or different texture.

Third Embodiment

Figure 12A:
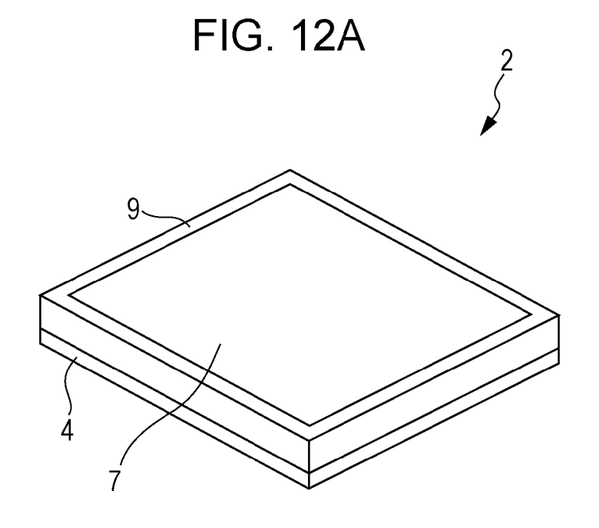
FIGS. 12A and 12B are schematic perspective views of a medium support unit according to a third embodiment of the invention.
Figure 12B:
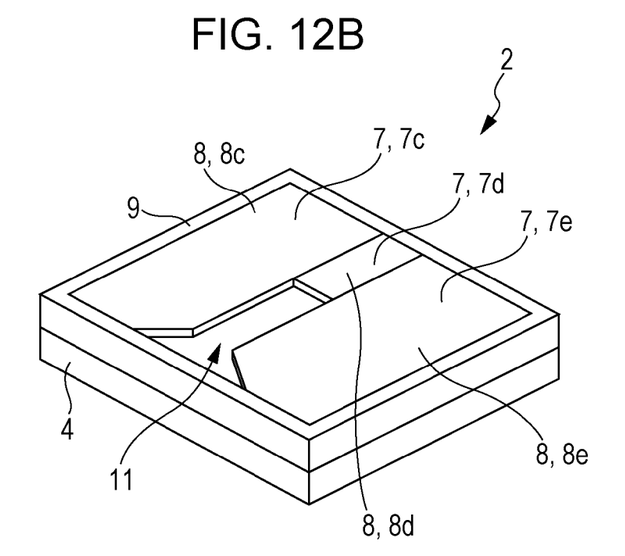

FIGS. 12A and 12B

Next, a medium support unit 2 according to a third embodiment of the invention will be described. The same components as those in the first and the second embodiments are denoted by the same reference numerals and the detailed description thereof will be omitted.

FIGS. 12A and 12B are schematic perspective views of the medium support unit 2 according to the third embodiment of the invention. Among them, FIG. 12A shows a state in which the depressed portion 11 is not formed and FIG. 12B shows a state in which the depressed portion 11 is formed.

In the medium support unit 2 of the first and the second embodiments, the tray 4 forms the support surface 7 and the depressed portion 11 is formed by removing the adjustment unit 8 from the tray 4. In other words, the adjustment unit 8 has a configuration in which the first state where the recessed portion is formed as the depressed portion 11 in the first area 11a and the second state where the recessed portion is not formed in the first area 11a can be formed.

In the configuration in which the depressed portion 11 is formed by removing the adjustment unit 8 from the tray 4 or moving the adjustment unit 8 from a position on the support surface 7, the depressed portion 11 can be easily formed.

On the other hand, as shown in FIG. 12A, the medium support unit 2 of the present embodiment has the tray 4 including the support surface 7 that does not have the depressed portion 11. When forming the depressed portion 11, as shown in FIG. 12B, the adjustment unit 8 including a plurality of adjustment units 8c, 8d, and 8e that form support surfaces 7c, 7d, and 7e instead of the support surface 7 of the tray 4 is mounted on the support surface 7. That is to say, the depressed portion 11 is formed by attaching the adjustment unit 8 with a space to the tray 4. In other words, the adjustment unit 8 has a configuration in which a first state where the depressed portion 11 is formed by forming the support surfaces 7c, 7d, and 7e as protruding portions (by attaching the adjustment units 8c, 8d, and 8e) and a second state where the depressed portion 11 is not formed by not forming the support surfaces 7c, 7d, and 7e (by removing the adjustment units 8c, 8d, and 8e) can be formed.

Also in the configuration in which the depressed portion 11 is formed by attaching the adjustment unit 8 with a space to the tray 4 or changing the position of the adjustment unit 8 so that a space is provided with respect to the tray 4, the depressed portion 11 can be easily formed.

All the adjustment units 8c, 8d, and 8e of the present embodiment have colors different from the color of the tray 4 and the colors are different from each other. Therefore, it is easy to visually distinguish the adjustment units 8c, 8d, and 8e with respect to the tray 4 and it is easy to know the sizes and shapes of the adjustment units 8c, 8d, and 8e. However, at least only one of the color and the texture of the adjustment units 8c, 8d, and 8e needs to be different from that of the tray 4. The adjustment units 8c, 8d, and 8e may have the same color and the same texture.

The invention is not limited to the above embodiments and various modifications can be made within the scope of the invention described in claims, and needless to say that the modifications are included in the scope of the invention.

The invention has been described based on the specific embodiments. Here, the invention will be collectively described.

The medium support unit 2 of a first aspect of the invention is characterized by including the support unit 4 having the support surface 7 that can support a medium and the adjustment unit 8 that can form the first state in which the recessed portion 11 that is recessed with respect to the support surface 7 or the protruding portions 7c, 7d, and 7e that protrude with respect to the support surface 7 are formed and the second state in which the recessed portion 11 or the protruding portions 7c, 7d, and 7e are not formed with respect to the support surface 7. At least one of the color and the texture is different between the support surface 7 and the adjustment unit 8.

According to this aspect, it is possible to form the depressed portion 11 in which a part of the medium supported by the support surface 7 is depressed with respect to the support surface 7. Therefore, even when a medium including a thick part is used, it is possible to suppress a rise of the medium supported by the support surface 7.

The "thick part" means a part which is thicker than the other parts of the medium. For example, when the medium is a garment, the thick part corresponds to a part where a pocket or a button is formed and a part where fabric is folded.

According to this aspect, at least one of the color and the texture is different between the support surface 7 and the adjustment unit 8. Therefore, it becomes easy to visually or tactually know a part where the depressed portion 11 is formed, so that it is easy to form the depressed portion 11.

"At least one of the color and the texture is different between the support surface 7 and the adjustment unit 8" means that the support surface 7 and the adjustment unit 8 can be visually or tactually distinguished from each other.

In the first aspect, the medium support unit 2 of a second aspect of the invention is characterized in that a material of the adjustment unit 8 is different from a material of the support unit 4.

According to this aspect, the material of the adjustment unit 8 is different from the material of the support unit 4. Therefore, the adjustment unit 8 and the support unit 4 can be formed of respective materials different from each other according to required characteristics such as weight and rigidity.

In the first aspect or the second aspect, the medium support unit 2 of a third aspect of the invention is characterized in that mass of the adjustment unit 8 is smaller than mass of the support unit 4.

According to this aspect, the mass of the adjustment unit 8 is smaller than the mass of the support unit 4. Accordingly, the adjustment unit 8 can be formed to be light in weight, so that the depressed portion 11 can be easily formed.

In any one of the first to the third aspects, the medium support unit 2 of a fourth aspect of the invention is characterized in that rigidity of the adjustment unit 8 is higher than that of the support unit 4.

According to this aspect, the rigidity of the adjustment unit 8 is higher than that of the support unit 4. Accordingly, the adjustment unit 8 can be made robust, so that damage of the adjustment unit 8 can be suppressed.

In any one of the first to the fourth aspects, the medium support unit 2 of a fifth aspect of the invention is characterized in that the first state is formed by attaching the adjustment unit 8 to the support unit 4 and the second state is formed by removing the adjustment unit 8 from the support unit 4.

According to this aspect, the depressed portion 11 is formed by removing the adjustment unit 8 from the support unit 4. Therefore, the adjustment unit 8 can be removed when forming the depressed portion 11, so that the weight of the medium support unit 2 can be reduced.

In any one of the first to the fourth aspects, the medium support unit 2 of a sixth aspect of the invention is characterized in that the first state or the second state is selected by changing a position of the adjustment unit 8 with respect to the support unit 4.

According to this aspect, the depressed portion 11 is formed by changing the position of the adjustment unit 8 with respect to the support unit 4. Therefore, the adjustment unit 8 need not be removed when forming the depressed portion 11, so that it is not necessary to provide an installation space of the adjustment unit 8 and it is possible to reduce the risk of missing the adjustment unit 8.

In any one of the first to the sixth aspects, the medium support unit 2 of a seventh aspect of the invention is characterized in that the adjustment unit 8 can form the first state in which the recessed portion 11 is formed and the second state in which the recessed portion 11 is not formed.

According to this aspect, the adjustment unit 8 can form the first state in which the recessed portion 11 is formed and the second state in which the recessed portion 11 is not formed. Therefore, the depressed portion 11 can be easily formed by removing the adjustment unit 8 from the support unit 4 or moving the adjustment unit 8 from a position on the support surface 7.

In any one of the first to the sixth aspects, the medium support unit 2 of an eighth aspect of the invention is characterized in that the adjustment unit 8 can form the first state in which the protruding portions 7c, 7d, and 7e are formed and the second state in which the protruding portions 7c, 7d, and 7e are not formed.

According to this aspect, the adjustment unit 8 can form the first state in which the protruding portions 7c, 7d, and 7e are formed and the second state in which the protruding portions 7c, 7d, and 7e are not formed. Therefore, the depressed portion 11 can be easily formed by attaching the adjustment unit 8 with a space to the support unit 4 or changing the position of the adjustment unit 8 so that a space is provided with respect to the support unit 4.

A recording device 1 of a ninth aspect of the invention is characterized by including the medium support unit 2 of any one of the first to the eighth aspects and a recording unit that can perform recording on the medium supported by the medium support unit 2.

According to this aspect, even when a medium including a thick part is used, it is possible to suppress a rise of the medium supported by the support surface 7, and at the same time it is possible to perform recording by easily forming the depressed portion 11.

A medium support method of a tenth aspect of the invention is a medium support method of the medium support unit 2 having the support unit 4 including the support surface 7 that can support a medium. The medium support method is characterized by including the step of causing the medium support unit 2 to support the medium by switching the medium support unit 2 between the first state in which the recessed portion 11 that is recessed with respect to the support surface 7 or the protruding portions 7c, 7d, and 7e that protrude with respect to the support surface 7 are formed and the second state in which the recessed portion 11 or the protruding portions 7c, 7d, and 7e are not formed with respect to the support surface 7 according to a type of the medium by using the adjustment unit 8 whose at least one of color and texture is different from that of the support surface 7.

According to this aspect, even when a medium including a thick part is used, it is possible to suppress a rise of the medium supported by the support surface 7, and at the same time it is possible to support the medium by easily forming the depressed portion 11.

The entire disclosure of Japanese Patent Application No. 2014-232592, filed Nov. 17, 2014 is expressly incorporated reference herein.

What is claimed is:

1. A medium support unit comprising:
a support unit including a support surface that can support a medium; and
an adjustment unit that can form a first state in which a first recessed portion that is recessed with respect to the support surface is formed and a second state in which the first recessed portion is not formed with respect to the support surface, wherein a second recessed portion that is recessed with respect to the support surface is formed in both the first and second states,
wherein at least one of color and texture is different between the support surface and the adjustment unit.

2. The medium support unit according to claim 1, wherein a material of the adjustment unit is different from a material of the support unit.

3. The medium support unit according to claim 1, wherein mass of the adjustment unit is smaller than mass of the support unit.

4. The medium support unit according to claim 1, wherein rigidity of the adjustment unit is higher than that of the support unit.

5. The medium support unit according to claim 1, wherein the first state is formed by attaching the adjustment unit to the support unit and the second state is formed by removing the adjustment unit from the support unit.

6. The medium support unit according to claim 1, wherein the first state or the second state is selected by changing a position of the adjustment unit with respect to the support unit.

7. A recording device comprising:
the medium support unit according to claim 1; and
a recording unit that can perform recording on the medium supported by the medium support unit.

8. A recording device comprising:
the medium support unit according to claim 2; and
a recording unit that can perform recording on the medium supported by the medium support unit.

9. A recording device comprising:
the medium support unit according to claim 3; and
a recording unit that can perform recording on the medium supported by the medium support unit.

10. A recording device comprising:
the medium support unit according to claim 4; and
a recording unit that can perform recording on the medium supported by the medium support unit.

11. A recording device comprising:
the medium support unit according to claim 5; and
a recording unit that can perform recording on the medium supported by the medium support unit.

12. A recording device comprising:
the medium support unit according to claim 6; and
a recording unit that can perform recording on the medium supported by the medium support unit.

13. A medium support method of a medium support unit having a support unit including a support surface that can support a medium, the medium support method comprising the step of:
causing the medium support unit to support the medium by switching the medium support unit between a first state in which a first recessed portion that is recessed with respect to the support surface is formed and a second state in which the first recessed portion is not formed with respect to the support surface according to a type of the medium by using an adjustment unit whose at least one of color and texture is different from that of the support surface, wherein a second recessed portion that is recessed with respect to the support surface is formed in both the first and second states.

* * * * *